Oct. 5, 1965  H. W. TEMPLETON  3,210,106
ANTI-UNSEATING BALL JOINT
Filed Oct. 8, 1962
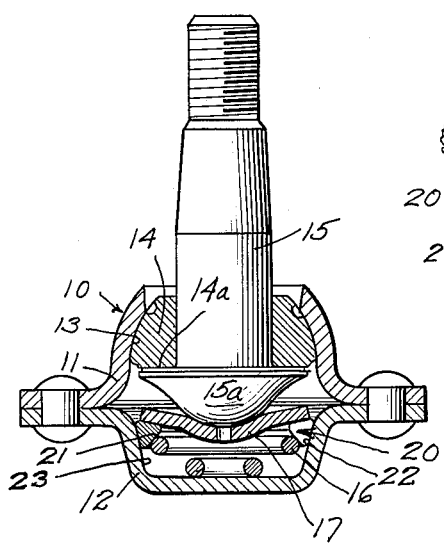
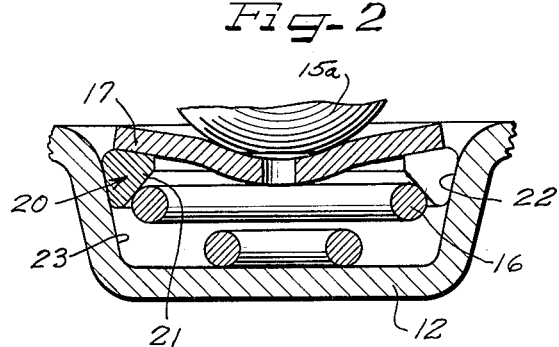
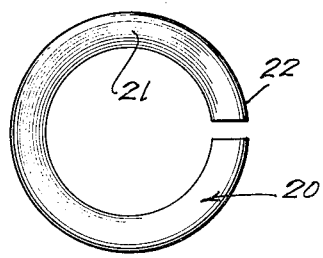
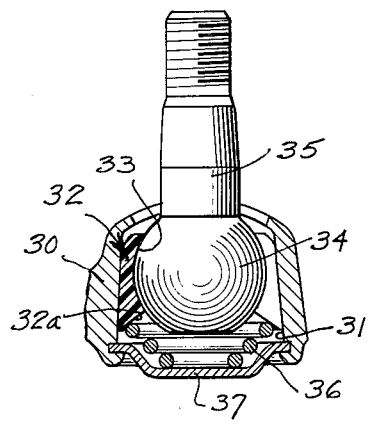
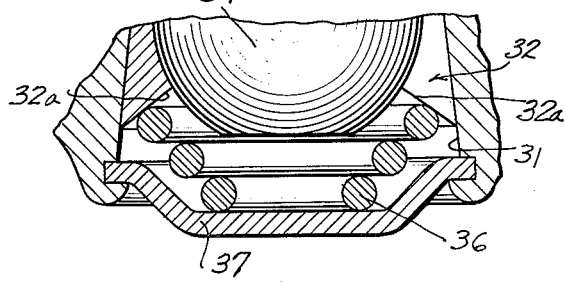
INVENTOR.
Herbert W. Templeton
BY
Hill, Sherman, Meroni, Gross & Simpson
ATTORNEYS

United States Patent Office 3,210,106
Patented Oct. 5, 1965

3,210,106
ANTI-UNSEATING BALL JOINT
Herbert W. Templeton, Southfield, Mich., assignor to TRW Inc., a corporation of Ohio
Filed Oct. 8, 1962, Ser. No. 229,073
3 Claims. (Cl. 287—87)

The present invention relates to ball and socket type joints and is, more particularly, concerned with the construction of an improved ball and socket joint of the type employing a stud having a segmental spherical surface seated in a mating socket and adapted to transfer loads transversely of the stud axis.

As those skilled in the art of ball and socket joints are aware, many hundreds of types of ball and socket joints have been constructed. A common use for such ball and socket joints comprises the steering linkage of automotive vehicles. In such automotive uses it is of the utmost importance that the joint be maintained in its designed relationship so that the forces being transferred by the linkage are transferred along their proper predetermined paths. At the same time it is very important that automotive steering linkages be capable of surviving extremely rough usage and that they be as inexpensive as possible. In the past it has been common practice to construct ball and socket type joints with spring bias acting against the stud to thereby not only accommodate manufacturing inaccuracies but also take up ordinary wear of the parts in use. While it has been considered desirable in the prior art ball joint devices to overcome the problem of wear, the unseating action is disadvantageous since it permits a change in steering linkage geometry, even though only of short duration, and, further, it is noticeably noisy during the unseating action.

In accordance with the present invention, a ball and socket construction is provided in which the ball stud is biased into its seated condition through the application of a resilient force acting against a frustro-conical surface causing that surface to move not only axially, but also wedgingly outwardly in a radial direction, to constantly apply a frictional wedging grip to a portion of the ball joint socket surface. This is accomplished in accordance with the present invention in several ways, two of which are specifically illustrated. In both of these a peripherally split conical annulus is provided in combination with a spring having an acting surface in contact with the annular conical surface of the annular member. The spring acts axially against the conical surface and in such action provides axial movement of the ball joint stud in a direction tending to seat it snugly in a segmental spherical bearing surface. A relatively mild taper is provided in combination with the outer peripheral surface of the split annulus and as a result of this taper and the cooperation of the inner conical surface of the annulus with the spring, the annulus is substantially rigidly wedged into cooperation with the stud socket, at least insofar as the application of impact type forces is concerned. On the other hand, small changes in dimension resulting from wear are constantly taken up by the resiliency of the ball joint structure without increasing the tendency of the ball joint stud member to unseat under load application.

It is, accordingly, an object of the present invention to provide an improved anti-unseating ball joint construction.

Another object of the present invention is to provide a ball joint in which spring biasing means is provided for providing a radial component of force tending to maintain the ball and socket parts in a design position under resilient bias.

Still a further object of the present invention is to provide a relatively simple ball joint construction capable of accepting heavy transverse loads without the ball joint components separating from each other, and at the same time providing a ball joint capable of constant adjustment for wear.

A feature of the invention resides in the utilization in a ball joint of a generally conical peripherally slit annulus under spring bias applied to the conical surface.

Still another feature of the invention is the provision of a ball stud having the ball thereof generally riding in a constricting socket such that resilient bias in the joint tends to more snugly confine the ball and providing therewith a cooperating peripherally slit annulus wedgingly positioned between the ball stud and the constriction to prevent unseating of the ball stud from the constricted socket surface.

Still other and further objects and features of the invention will at once become apparent to those skilled in the art from a consideration of the attached drawings wherein two embodiments of the invention are shown by way of illustration only, and wherein:

FIGURE 1 is a side-elevational view in partial cross-section of a ball joint constructed in accordance with the principles of the present invention;

FIGURE 2 is an enlarged partial view of the spring-biased conically surfaced annulus of the joint of FIGURE 1;

FIGURE 3 is a plan view of the annulus employed in combination with the joint structure of FIGURES 1 and 2;

FIGURE 4 is a side-elevational view of a modified form of ball joint constructed in accordance with the present invention; and FIGURE 5 is an enlarged illustration of the portion of the joint of FIGURE 4 which acts as a wedging annulus.

As may be seen from a consideration of the drawings, two embodiments of the anti-unseating ball joint of the present invention are illustrated. Although the physical structure of the two forms varies in some significant respects, it will be observed that in each embodiment, a radially outwardly expandable annulus cooperates with a tapered surface to provide semi-irreversibility of axial movement under transverse and/or axial loads.

In FIGURE 1 a socket member generally indicated at 10 comprises upper and lower sheet metal stamping members 11 and 12, respectively. Member 11 is provided with a segmental spherical inwardly facing surface 13 which cooperates with s segmental spherical bearing member 14 carried by a stud 15. The stud member 15 is rotatably mounted within the bearing ring 14 and is maintained axially against the lower surface 14a thereof by means of a spring 16 acting against the stud head 15a via pressure plate 17 and slit annulus 20. As those skilled in the art of ball joint construction for automotive use are aware, spring biased ball studs of the type employing a spring biased ball stud seat are well known. However, in such prior art structures the seat is essentially free floating under the influence of the spring and upon the application of sufficient transverse or axial loads to the stud, the stud, bearing ring and spring seat all move axially of the socket away from the bearing surface 13. This axial movement under impact loads and the like is undesirable since it results in increased wear on the component parts, spring breakage, undesirable noises in the joint and permanent deformation of the spring with resultant loss of spring effectiveness. In prior art mechanisms the amount of unseating has often been controlled by providing a stop device between the spring seat and the bottom of the socket. However, manufacturing techniques employed in the construction of ball and socket type joints require tolerance latitude in each of the component parts which, when added together, will very often permit much more than the desired amount of unseating.

In accordance with the present invention, unseating is substantially eliminated without elimination of the wear take-up capabilities of the joint, by the addition to the system of slit annulus 20. As may be seen in FIGURE 1, the annulus 20 is provided with a generally conical inwardly facing surface 21 which cooperates with the spring 16 and a slightly tapered or conical surface 22 which cooperates with a slightly tapered inwardly facing surface 23 of member 12. The annulus 20 is positioned between the spring 16 and the spring seat 17 so that the biasing force of the spring 16 must pass through the annulus 20 in its action against the spring seat 17 and ball stud 15.

In operation the spring bias applied by spring 16 in the embodiment shown in FIGURE 1 acts through the annulus 20 and spring seat 17 to snugly position the ball stud 15 and the bearing ring 14 upwardly against the segmental spherical bearing surface 13 of the socket assembly. Movement of the stud upwardly as illustrated in FIGURE 1, under the influence of spring 16 is readily accomplished. However, this movement is to a high degree irreversible in accordance with the present invention. This irreversibility is provided by cooperation of the spring 16 with the conical surface 21. As the spring 16 acts upwardly against the conical surface 21, it radially expands the annulus 20 causing the annulus 20 to wedgingly engage the surface 22. This wedging action resists axial movement downwardly under impact forces applied to the stud either transversely or, for that matter, axially downwardly. Thus, it will be seen that the joint is constantly automatically adjusted for wear take-up purposes and for the purpose of accommodating manufacturing tolerance discrepancies. Complete freedom of pivotal motion is provided for the joint without, at the same time, providing a joint construction susceptible of spring damage, noise, and excessive wear caused by unseating forces.

The structure illustrated in FIGURES 4 and 5 is similar in operation. The socket member 30 is provided with a slightly tapered internal surface 31 which accommodates a similarly tapered bearing seat 32 having a segmental spherical inwardly facing surface 33 cooperating with a generally spherical ball 34 carried by stud 35. Spring 36, which is seated against closure plate 37 acts upwardly, as viewed in FIGURES 4 and 5, against a downwardly facing conical surface 32a of the seat 32. It will be observed that the spring 36 will act upwardly against the conical surface 32a causing the split bearing seat 32 to move upwardly and, accordingly, to be contracted slightly by action of the tapered surface 31. This contraction provides a snug fit between the seat 32 and the ball 34. At the same time, the action of the spring 36 causes radially outward wedging of the seat 32 against the relatively slightly tapered surface 31 and as a result of this wedging action, movement of the stud axially downwardly is substantially resisted, thereby providing a relatively irreversible slack take-up system.

It will be understood that the irreversible action achieved in accordance with the principles of the present invention may be accomplished in ball and socket joints by embodiments of the invention other than those specifically illustrated. It is, accordingly, my intent that the scope of the present invention be limited solely by the scope of the hereinafter appended claims.

I claim as my invention:

1. In combination in a ball joint having a stud comprising a shank portion and a head adjacent one end thereof and adapted to transfer loads applied transversely of the axis of the stud, comprising a member having a socket with a portion shaped complementary to said head for cooperation with the stud and enclosing said head, said socket having an annular side wall becoming smaller in diameter in the direction along the axis of the stud and away from the head of the stud toward the shank portion thereof, said socket also comprising a stud-receiving aperture at one end and a closure means at the other end thereof, means applying a resilient force axially of said socket in the direction of smaller diameter to maintain said stud seated in the socket, said last-named means comprising an annular pressure member and spring means positioned between said pressure member and said closure means, an annular conical seat in said socket between said head and said other end becoming smaller in diameter along the axis of the stud in the direction opposite the direction of reduction in diameter of said side wall, said pressure member having a radially inwardly facing conical surface reducing in diameter in the direction of reduction in diameter of the side wall in force transmitting contact with said spring means and having a peripheral split therein permitting radially outward expansion thereof under axial pressure by said spring and having a radially outwardly facing surface in co-operating contact with said annular conical seat, said pressure member operatively contacting said stud head, whereby said pressure member acts to direct the force of said spring means against said stud and simultaneously acts to expand outwardly against said annular conical seat to prevent said stud from axial movement under sudden loads.

2. A ball joint combination as set forth in claim 1, wherein said pressure member engages said stud head by way of a pressure plate.

3. A ball joint combination as set forth in claim 2 wherein said pressure plate comprises a generally conical surface facing said pressure member, which conical surface has an included angle greater than that of a conical surface of said conical seat.

References Cited by the Examiner

UNITED STATES PATENTS

| | | |
|---|---|---|
| 1,604,867 | 10/26 | Woodruff _____ 285—267 |
| 1,985,728 | 12/34 | Ingersoll. |
| 3,004,786 | 10/61 | Herbenar. |

FOREIGN PATENTS

| | | |
|---|---|---|
| 1,013,151 | 4/52 | France. |
| 526,263 | 9/40 | Great Britain. |

CARL W. TOMLIN, *Primary Examiner.*